US010129941B1

(12) United States Patent
Navabi-Shirazi et al.

(10) Patent No.: US 10,129,941 B1
(45) Date of Patent: Nov. 13, 2018

(54) LED DRIVER GATE CLAMP SYSTEMS AND METHODS

(71) Applicant: Apple Inc., Cupertino, CA (US)

(72) Inventors: Mohammad J. Navabi-Shirazi, San Jose, CA (US); Jingdong Chen, San Jose, CA (US); Asif Hussain, San Jose, CA (US); Yanhui Xie, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/691,672

(22) Filed: Aug. 30, 2017

Related U.S. Application Data

(60) Provisional application No. 62/505,779, filed on May 12, 2017.

(51) Int. Cl.
*H05B 37/02* (2006.01)
*H05B 33/08* (2006.01)

(52) U.S. Cl.
CPC ..... *H05B 33/0824* (2013.01); *H05B 33/0845* (2013.01)

(58) Field of Classification Search
CPC ............. H05B 33/0824; H05B 33/083; H05B 33/0842; H05B 33/0845; H05B 5837/02
USPC ................... 315/291, 297, 301, 306–307
See application file for complete search history.

(56) References Cited

U.S. PATENT DOCUMENTS

| 9,018,859 | B2 | 4/2015 | Hu | |
|---|---|---|---|---|
| 9,024,528 | B2 | 5/2015 | Zhang | |
| 2009/0128055 | A1* | 5/2009 | Shin | H05B 33/0818 315/301 |
| 2011/0062872 | A1* | 3/2011 | Jin | H05B 33/0818 315/122 |
| 2014/0016304 | A1 | 1/2014 | Gao et al. | |
| 2014/0097754 | A1* | 4/2014 | Chiang | H05B 33/089 315/122 |

* cited by examiner

*Primary Examiner* — Douglas W Owens
*Assistant Examiner* — Henry Luong
(74) *Attorney, Agent, or Firm* — Morgan, Lewis & Bockius LLP

(57) ABSTRACT

Aspects of the subject technology relate to display circuitry such as backlight control circuitry for operating light-emitting diodes (LEDs). The backlight control circuitry may include a pulse-width-modulation (PWM) transistor and a current regulation transistor coupled in series with at least one LED. The current regulation transistor may have a gate terminal that receives a feedback-controlled gate voltage. The backlight control circuitry may include a gate clamp circuit coupled to the gate terminal of the current regulation transistor that clamps the gate voltage during a portion of a PWM on pulse.

18 Claims, 5 Drawing Sheets

LED DRIVER GATE CLAMP SYSTEMS AND METHODS

CROSS-REFERENCE TO RELATED APPLICATIONS

The present application claims the benefit of U.S. Provisional Patent Application Ser. No. 62/505,779, entitled "LED Driver Gate Clamp Systems and Methods," filed on May 12, 2017, which is hereby incorporated by reference in its entirety for all purposes.

TECHNICAL FIELD

The present description relates generally to electronic devices with light-emitting-diodes, and more particularly, but not exclusively, to electronic devices with light-emitting-diodes with pulse-width-modulation.

BACKGROUND

Electronic devices such as computers, media players, cellular telephones, set-top boxes, and other electronic equipment are often provided with light-emitting-diodes (LEDs) for illuminating portions of the device and/or providing visual indicators of device status.

In some devices, LEDs are included in displays such as organic light-emitting diode (OLED) displays and liquid crystal displays (LCDs) typically include an array of display pixels arranged in pixel rows and pixel columns. Liquid crystal displays commonly include a backlight unit and a liquid crystal display unit with individually controllable liquid crystal display pixels. The backlight unit commonly includes one or more light-emitting diodes (LEDs) that generate light that exits the backlight toward the liquid crystal display unit. The liquid crystal display pixels are individually operable to control passage of light from the backlight unit through that pixel to display content such as text, images, video, or other content on the display.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
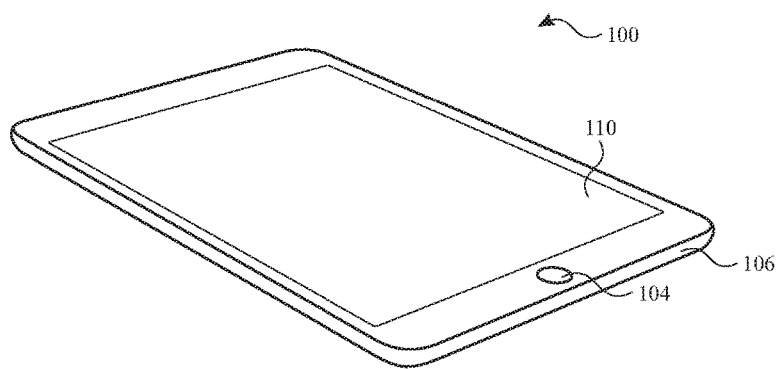
FIG. 1 illustrates a perspective view of an example electronic device in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides electronic devices such as cellular telephones, media players, computers, laptops, tablets, set-top boxes, wireless access points, and other electronic equipment that may include light-emitting-diodes (LEDs). For example, electronic devices may include LEDs in displays that may be used to present visual information and status data and/or may be used to gather user input data, keyboards, flash LEDs, and/or other components. The brightness of the LEDs may be controlled by a pulse-width-modulation (PWM) signal.

Various examples are described herein in the context of LEDs and associated LED control circuitry implemented in display backlights. However, it should be appreciated that these examples are merely illustrative and the disclosed LED control systems and methods described herein may be implemented in other contexts in which PWM control of LEDs is desired (e.g., for illumination of keyboards, flash components, etc.).

A display may include an array of display pixels. Each display pixel may include one or more colored subpixels for displaying color images. Each display pixel may include a layer of liquid crystals disposed between a pair of electrodes operable to control the orientation of the liquid crystals. Controlling the orientation of the liquid crystals controls the polarization of backlight generated by a backlight unit of the display. This polarization control, in combination with polarizers on opposing sides of the liquid crystal layer, allows light passing into the pixel to be manipulated to selectively block the light or allow the light to pass through the pixel.

The backlight unit may include one or more strings of light-emitting diodes and associated backlight control circuitry that generate the backlight for the display. The strings of light-emitting diodes may be arranged along one or more edges of a light guide plate that distributes backlight generated by the strings to the LCD unit, or may be arranged to form a two-dimensional grid of LEDs.

The backlight unit includes backlight control circuitry for operating the strings of LEDs. The backlight control circuitry may include a pulse-width-modulation (PWM) transistor and a current regulation transistor coupled in series with each string of LEDs. The PWM transistor is operated as a switch such that the current through the LEDs is pulsed and a duty cycle of the LED current is used to control dimming of the LEDs. The current regulation transistor forms a portion of a current regulation loop that includes an operational amplifier coupled to the gate of the current regulation transistor. The operational amplifier uses a feedback loop to control the current through the current regulation transistor during the on pulses of the PWM cycle of the PWM transistor.

However, during the off pulses of the PWM transistor, there is no current flowing in the LEDs or the current regulation transistor. In some scenarios, without current flow, the current regulation transistor, which is in the regulating feedback loop, goes out of regulation. The operational amplifier still tries to correct the loop and drives the gate (e.g., in case of a metal oxide semiconductor field effect transistor (MOSFET) implementation of the current regulation transistor) of the current regulation transistor up to the supply rail voltage. In these scenarios, when the PWM switch is turned back on, the gate voltage of the current regulation transistor, being at the supply rail voltage, transitions back down to the regulation value. However, because the operational amplifier takes some time to bring the gate voltage of the current regulation transistor down to the desired voltage, a current spike can occur in the LED PWM pulse. If care is not taken, this type of current spike can occur anytime the feedback loop of the current regulation transistor is opened and closed again.

Backlight control circuitry and associated methods of operation of the backlight circuitry disclosed herein may help reduce or eliminate this type of voltage spike that occurs at the rising edge of the PWM cycle. Reducing or eliminating voltage spikes at the rising edge of the PWM cycle may help improve the accuracy of the average current that is provided to the strings of LEDs, may help avoid electromagnetic interference (EMI) with other components of the device, and/or may help improve the reliability of the LED driver circuitry.

As described in further detail hereinafter, the backlight control circuitry and associated methods may include using a gate clamp circuit coupled to the gate of the current regulation transistor to clamp the gate voltage of the current regulation transistor to a voltage at or slightly above the regulating voltage for the on pulse of the PWM cycle. In this way, once the feedback loop of the current regulation transistor is broken, the gate voltage remains or rises slightly and, once the loop is reconnected, the gate voltage can be returned to the regulation voltage quickly. In backlight systems, the output current is often known, and it is therefore possible to create a replica of the gate voltage and, if desired, add a small margin to the replica voltage and use this replica voltage as a reference for clamping.

The gate clamp circuit may include a replica circuit that duplicates the regulated gate voltage of the current driver device or may include a sample-and-hold circuit that samples the gate voltage during an on pulse of the PWM cycle and holds the gate voltage during the off pulse of the PWM cycle.

An illustrative electronic device of the type that may be provided with one or more LEDs and associated LED control circuitry (e.g., in a display) is shown in FIG. 1. In the example of FIG. 1, device 100 has been implemented using a housing that is sufficiently small to be portable and carried by a user (e.g., device 100 of FIG. 1 may be a handheld electronic device such as a tablet computer or a cellular telephone). As shown in FIG. 1, device 100 may include a display such as display 110 mounted on the front of housing 106. Display 110 may be substantially filled with active display pixels or may have an active portion and an inactive portion. Display 110 may have openings (e.g., openings in the inactive or active portions of display 110) such as an opening to accommodate button 104 and/or other openings such as an opening to accommodate a speaker, a light source, or a camera.

Display 110 may be a touch screen that incorporates capacitive touch electrodes or other touch sensor components or may be a display that is not touch-sensitive. Display 110 may include display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Arrangements in which display 110 is formed using LCD pixels and LED backlights are sometimes described herein as an example. This is, however, merely illustrative. In various implementations, any suitable type of display technology may be used in forming display 110 if desired.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a somewhat smaller portable device such as a wrist-watch device, a pendant device, or other wearable or miniature device, a media player, a gaming device, a navigation device, a computer monitor, a television, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations.

In some implementations, electronic device 100 may be provided in the form of a computer integrated into a computer monitor. Display 110 may be mounted on a front surface of housing 106 and a stand may be provided to support housing (e.g., on a desktop).

Figure 2:
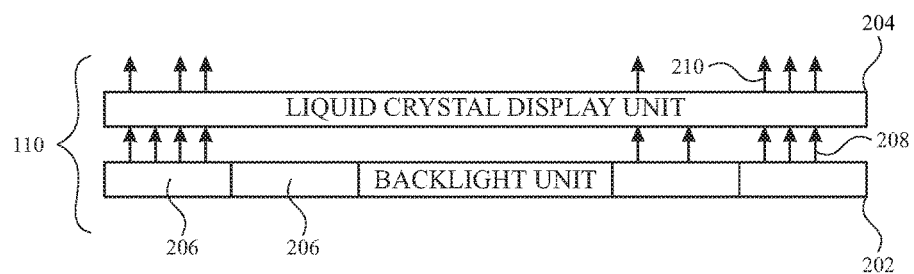
FIG. 2 illustrates a block diagram of a side view of an electronic device display having a backlight unit in accordance with various aspects of the subject technology.

FIG. 2 is a schematic diagram of display 110 showing how the display may be provided with a liquid crystal display unit 204 and a backlight unit 202. As shown in FIG. 2, backlight unit 202 generates backlight 208 and emits backlight 208 in the direction of liquid crystal display unit 204. Liquid crystal display unit 204 selectively allows some or all of the backlight 208 to pass through the liquid crystal display pixels therein to generate display light 210 visible to a user. Backlight unit may include one or more subsections 206. In some implementations, subsections 206 may be elongated subsections that extend horizontally or vertically across some or all of display 110 (e.g., in an edge-lit configuration for backlight unit 202). In other implementations, subsections 206 may be square or nearly square subsections (e.g., in a two-dimensional array backlight configuration). Accordingly, subsections 206 may be defined one or more strings of LEDs disposed in that subsection. Subsections 206 may be controlled individually for local dimming of backlight 208.

Figure 3:
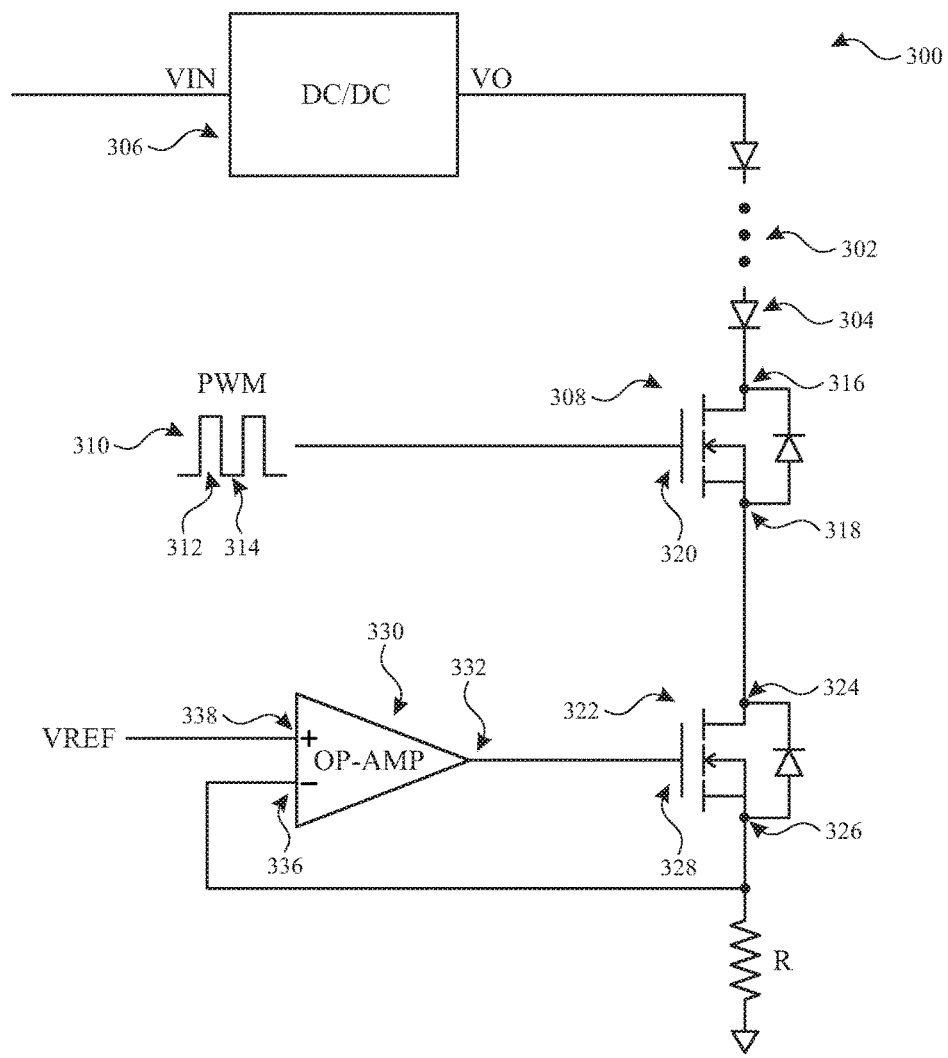
FIG. 3 illustrates a schematic view of LED control circuitry including pulse-width modulation circuitry in accordance with various aspects of the subject technology.

FIG. 3 shows a schematic diagram of exemplary LED control circuitry 300 (e.g., backlight control circuitry that may be implemented in backlight unit 202). In the example of FIG. 3, circuitry 300 includes at least one string 302 of LEDs 304. Strings 302 each include one or more LEDs 304 in series. LEDs 304 received a voltage Vo, at a first end of string 302 from, for example, DC/DC converter 306. LEDs 304 are also coupled, at a second end of string 302, in series with cascaded transistors 308 and 322 (e.g., field effect transistors such as metal oxide semiconductor field effect transistors) that control the current through LEDs 304. Transistor 322, in combination with a reference voltage supply that supplies a reference voltage VREF and operational amplifier 330 may form a current regulation controller for LEDs 304 that controls a peak current through string 302. Transistor 308 may combine with a pulse-width-modulation signal provider that provides a PWM signal 310, to control an average current through string 302 by reducing the peak current allowed by the current regulation controller according to a duty cycle of the PWM signal.

As shown in FIG. 3, transistor 308 is a pulse-width modulation transistor having a first source/drain terminal 316 coupled to LEDs 304, a gate terminal 320 configured to receive pulse-width modulation signal 310, and a second source/drain terminal 318. Transistor 322 is a current regulation transistor having a first source/drain terminal 324 coupled to second source/drain terminal 318 of pulse-width modulation transistor 308, a gate terminal 328 coupled to an output 332 of an operational amplifier 330, and a second source/drain terminal 326 coupled to a ground voltage through a resistor R. In this way, backlight circuitry 300 includes a cascade of two active devices to control the current, one arranged for current regulation and the other implemented as a switch for PWM pulse-width current control.

PWM signal 310 includes alternating on pulses 312 and off pulses 314. The width (e.g., the length of time) of pulses 312 and 314 can be controlled to control a duty cycle of the current through LEDs 304 to, for example, provide a dimming of LEDs 304 without changing the voltage Vo. During off pulses 314, when transistor 308 is off, there is no current flowing in LEDs 304 or transistor 322. As shown in FIG. 3, current regulation transistor 322 forms part of a current regulation feedback loop including amplifier 330. In some situations, the impedance of operational amplifier 330 may be used help reduce or prevent voltage spikes at gate terminal 328 at or near the rising edge of PWM signal 310. However, in some situations, it may be desirable to provide backlight circuitry 300 with a separate gate clamp circuit (e.g., in situations in which the impedance of amplifier 330 may not be enough to reduce the voltage spike at the rising edge of PWM signal 310).

Figure 4:
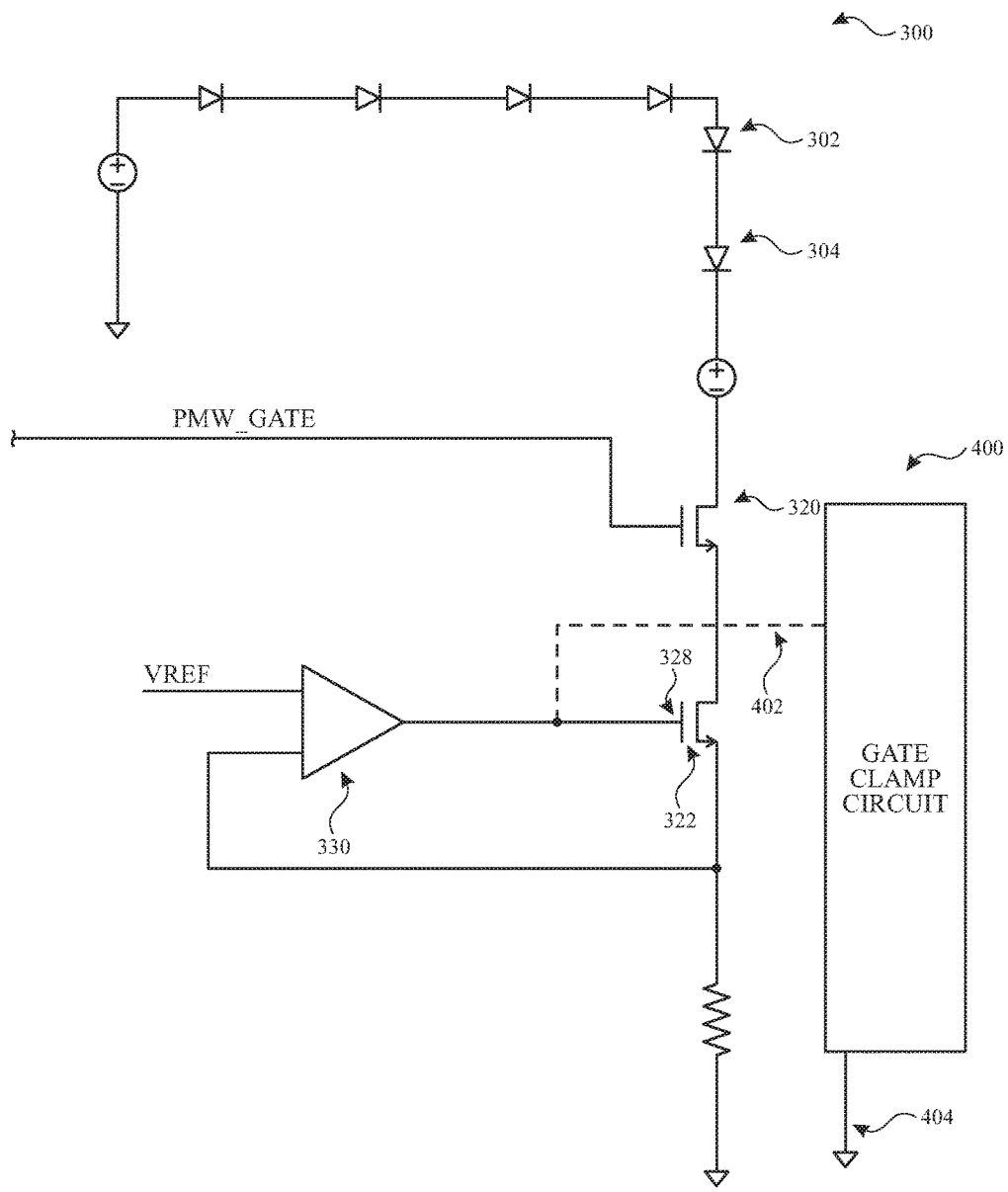
FIG. 4 illustrates a schematic view of LED control circuitry including pulse-width modulation circuitry and a gate clamp circuit in accordance with various aspects of the subject technology.
Figure 5:
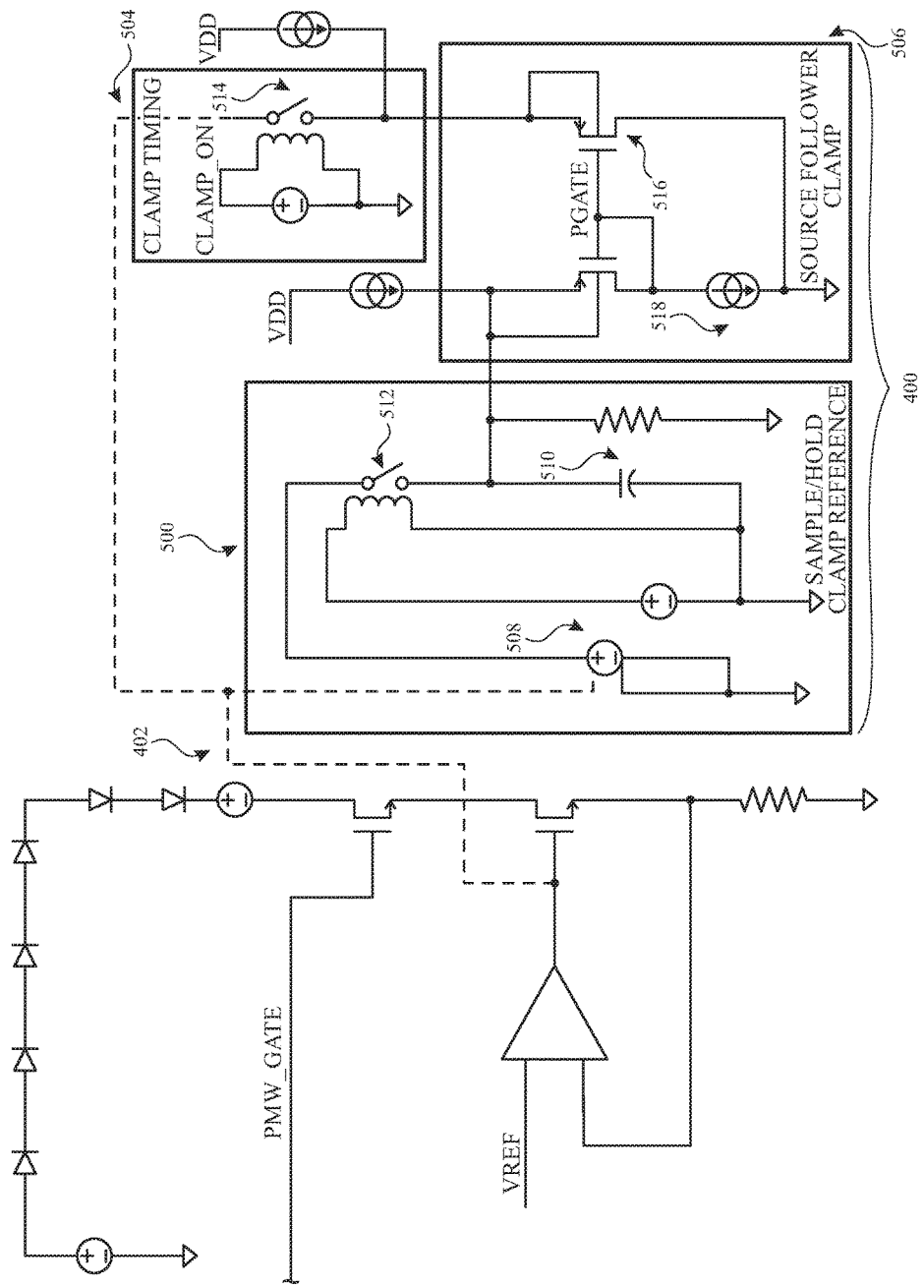
FIG. 5 illustrates a schematic view of further details of LED control circuitry including pulse-width modulation circuitry and a gate clamp circuit in accordance with various aspects of the subject technology.

FIGS. 4 and 5 show exemplary implementations of backlight circuitry 300 having a gate clamp circuit. As shown in FIG. 4, circuitry 300 may include a clamping circuit such as gate clamp circuit 400. The clamping circuit clamps a voltage of the current regulation controller (e.g., including transistor 322 and amplifier 330) during at least a portion of an on pulse of PWM signal 310. In the example of FIG. 4, gate clamp circuit 400 is coupled (e.g., by conductive trace 402) to gate terminal 328 of current regulation transistor 322 (e.g., between gate terminal 328 and ground 404). Gate clamp circuit 400 clamps the gate voltage of gate terminal 328 of current regulation transistor 322 to the desired voltage. For example, gate clamp circuit 400 obtains a gate voltage of the gate terminal of the current regulation transistor during an on pulse of a pulse-width modulation cycle of the pulse-width modulation transistor and clamps the gate voltage of the gate terminal of the current regulation transistor to the obtained gate voltage during a portion of a subsequent on pulse of the pulse-width modulation cycle of the pulse-width modulation transistor. In this way, breaking the regulation loop, or coupling from drain 326 to gate 328, will not be able to raise the gate voltage above its previous voltage during regulation.

As described in further detail hereinafter, gate clamp circuit may be active for a short period during and shortly after the PWM-on rising edge, and can be disabled once voltage transients have subsided, thus allowing the control loop of transistor 322 and amplifier 330 to raise the gate voltage, if desired for regulation, to generate a higher LED current. Gate clamp circuit 400 may create a replica of the gate voltage during a PWM-on pulse 312 to use as a reference voltage for clamping. In some scenarios, the reference voltage may be offset slightly higher (e.g., to allow for minor shifts or inaccuracies in duplicating the original PWM on pulse gate voltage).

FIG. 5 shows additional details of an exemplary implementation of gate clamp circuit 400. In the example of FIG. 5, gate clamp circuit 400 includes a reference generator circuit 500, a clamp timing circuit 504, and a clamping circuit 506. Reference generator circuit 500 obtains a reference voltage that is substantially equal to the gate voltage of transistor 322 during an on pulse 312 of a PWM signal 310 for current regulation transistor 322. Clamp circuit 506 pulls current when a current gate voltage of the gate terminal 328 of the current regulation transistor 322 exceeds the obtained reference gate voltage. Timing circuit 504 activates the gate clamp circuit (e.g., activates clamping circuit 506) during a portion of a subsequent on pulse. The portion of the subsequent on pulse may be a relatively small fraction of the time of the on pulse (e.g., less than 10 percent, less than 5 percent, less than 3 percent, less than one percent, or less than a fraction of a percent of the time of the on pulse). For example, the portion of the subsequent on pulse may be as small as or less than 5 microseconds, 1 microsecond, 100 nanoseconds, 50 nanoseconds or 20 nanoseconds.

In the example of FIG. 5, reference generator circuit 500 is implemented as a sample-and-hold circuit that samples the gate voltage during the PWM-on pulse 312 and holds the sampled gate voltage during the subsequent PWM-off pulse 314. As shown, the sample-and-hold circuit 500 includes a power supply 508 that receives the gate voltage of gate terminal 328, the power supply being coupled through a switch 512 to a capacitor 510 for holding the received gate voltage as a reference voltage. However, this is merely illustrative.

In other implementations, reference generator circuit 500 may be implemented as a scaled down replica of the output stage (e.g., transistor 322 and/or amplifier 330) so that a gate voltage of the replica device can be used as the clamp reference voltage. Clamp timing circuit 504 and/or clamping circuit 506 may be provided with a reference generator circuit 500 that is implemented as a sample-and-hold circuit or a replica circuit (as examples).

In the example of FIG. 5, clamping circuit 506 is implemented as a source follower circuit (e.g., a voltage follower stage such as a p-type metal-oxide-semiconductor (PMOS) output stage). As shown, source follower circuit 506 may include transistor 516 having a first source/drain terminal switchably coupled to the gate voltage of the gate terminal 328 of the current regulation transistor 322, a gate terminal coupled to a first side of a current sink 518, and a second source/drain terminal coupled to a second side of the current sink 518. The first source/drain terminal of transistor 516 is switchably coupled to the gate voltage of the gate terminal 328 of the current regulation transistor 322 by a switch 514 of clamp timing circuit 504. Switch 514 may be operated so that clamp circuit 506 is only active during a short period after the PWM on pulse 312 has started. In some implementations, source follower circuit 506 may include additional circuitry such as an additional transistor having a gate that is coupled to the gate of transistor 516 as shown.

Figure 6:
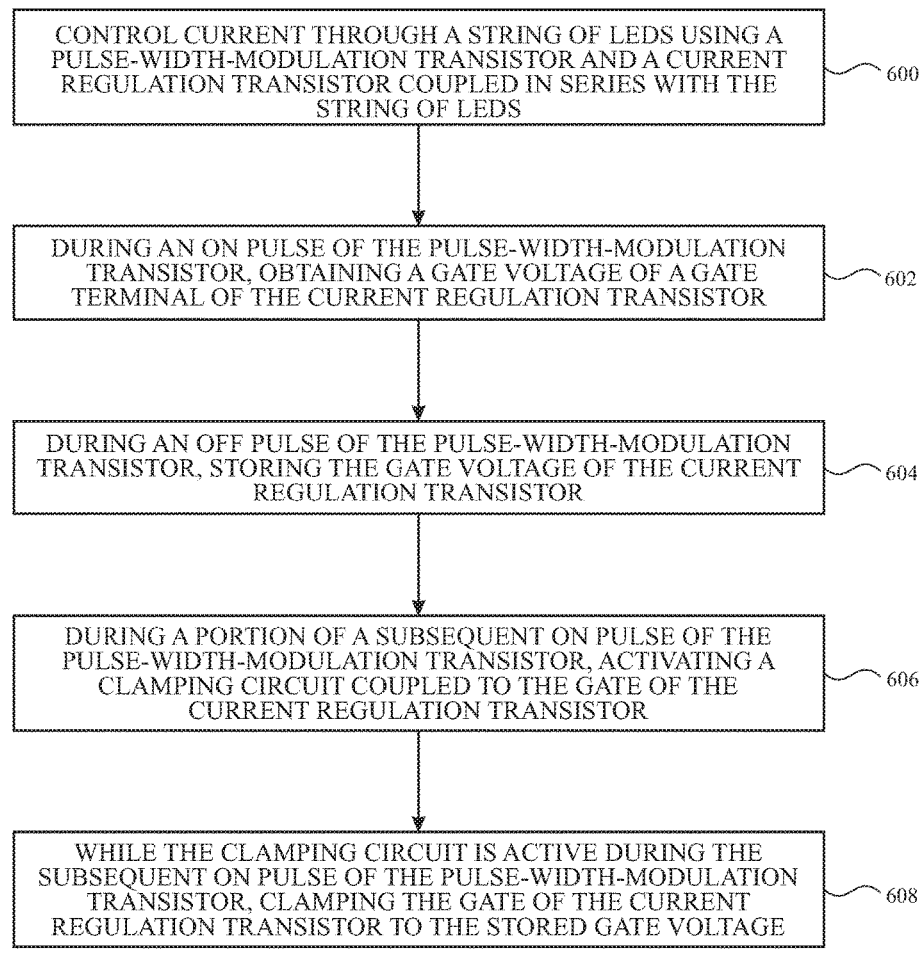
FIG. 6 illustrates a flow chart of illustrative operations that may be used for operating the LED control circuitry of FIGS. 4 and 5 in accordance with various aspects of the subject technology.

FIG. 6 depicts a flow diagram of an example process for headroom voltage reduction for electronic device displays in accordance with various aspects of the subject technology. For explanatory purposes, the example process of FIG. 6 is described herein with reference to the components of FIGS. 1-5. Further for explanatory purposes, the blocks of the example process of FIG. 6 are described herein as occurring in series, or linearly. However, multiple blocks of the example process of FIG. 6 may occur in parallel. In addition, the blocks of the example process of FIG. 6 need not be performed in the order shown and/or one or more of the blocks of the example process of FIG. 6 need not be performed.

In the depicted example flow diagram, at block 600, a current through a string such as string 302 of LEDs such as LEDs 304 may be controlled using a pulse-width-modulation transistor such as transistor 308 and a current regulation transistor such as a transistor 322 coupled in series with the string of LEDs. Controlling the current may include providing PWM signal 310 to gate terminal 320 of transistor 308 and regulating the current using operational amplifier 330 having output 332 switchably coupled to gate terminal 328 of transistor 322.

At block 602, during an on pulse 312 of the pulse-width-modulation transistor 308, a gate voltage of a gate terminal 328 of the current regulation transistor 322 may be obtained. The gate voltage of the gate terminal 328 of the current regulation transistor 322 may be obtained by a reference generator circuit such as reference generator circuit 500 of FIG. 5 (e.g., a replica circuit or a sample-and-hold circuit) that is coupled to gate terminal 328.

At block 604, during an off pulse 314 of the pulse-width-modulation transistor 308, the obtained gate voltage of the current regulation transistor 322 may be stored (e.g., by the reference generator circuit).

At block 606, during a portion of a subsequent on pulse 312 of the pulse-width-modulation transistor 308, a clamping circuit 506 coupled to the gate terminal 328 of the current regulation transistor 322 may be activated. A timing circuit such as clamp timing circuit 504 may be operated to activate the clamping circuit.

At block 608, while the clamping circuit 506 is active during the subsequent on pulse 312 of the pulse-width-modulation transistor 308, the gate terminal 328 of the current regulation transistor 322 may be clamped by the clamping circuit 506 to the stored gate voltage. Clamping gate terminal 328 may include activating the clamping circuit if the gate voltage of gate terminal 328 starts to exceed the stored clamp reference voltage and holding the gate voltage of gate terminal 328 by pulling current (e.g., using current sink 518).

In accordance with various aspects of the subject disclosure, an electronic device with a display is provided, the display including at least one light-emitting diode and a pulse-width modulation transistor having a first source/drain terminal coupled to the at least one light-emitting diode, a gate terminal configured to receive a pulse-width modulation signal, and a second source/drain terminal. The display also includes a current regulation transistor having a first source/drain terminal coupled to the second source/drain terminal of the pulse-width modulation transistor, a gate terminal coupled to an output of an operational amplifier, and a second source drain terminal coupled to a ground voltage through a resistor. The display also includes a gate clamp circuit coupled to the gate terminal of the current regulation transistor.

In accordance with other aspects of the subject disclosure, a method is provided that includes controlling current through at least one light-emitting diode using a pulse-width-modulation transistor and a current regulation transistor coupled in series with the at least one light-emitting diode. The method also includes, during an on pulse of the pulse-width-modulation transistor, obtaining a gate voltage of a gate terminal of the current regulation transistor. The method also includes, during an off pulse of the pulse-width-modulation transistor, storing the gate voltage of the current regulation transistor. The method also includes, during a subsequent on pulse of the pulse-width-modulation transistor, clamping the gate terminal of the current regulation transistor to the stored gate voltage using a clamping circuit coupled to the gate terminal of the current regulation transistor.

In accordance with other aspects of the subject disclosure, an electronic device having a display with a backlight is provided, the backlight including a light-emitting diode and a pulse-width modulation controller configured to control an average current through the light-emitting diode. The backlight also includes a current regulation controller configured to control a peak current through the light-emitting diode. The backlight also includes a clamping circuit coupled to the current regulation controller and configured to clamp a voltage of the current regulation controller during at least a portion of an on pulse of the pulse-width modulation controller.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device with a display, the display comprising:
   at least one light-emitting diode;
   a pulse-width modulation transistor having a first source/drain terminal coupled to the at least one light-emitting diode, a gate terminal configured to receive a pulse-width modulation signal, and a second source/drain terminal;
   a current regulation transistor having a first source/drain terminal coupled to the second source/drain terminal of the pulse-width modulation transistor, a gate terminal coupled to an output of an operational amplifier, and a second source drain terminal coupled to a ground voltage through a resistor; and
   a gate clamp circuit coupled to the gate terminal of the current regulation transistor,
   wherein the gate clamp circuit is configured to obtain a gate voltage of the gate terminal of the current regulation transistor during an on pulse of a pulse-width modulation cycle of the pulse-width modulation transistor and clamp the gate voltage of the gate terminal of the current regulation transistor to the obtained gate voltage during a portion of a subsequent on pulse of the pulse-width modulation cycle of the pulse-width modulation transistor.

2. The electronic device of claim 1, wherein the gate clamp circuit comprises a sample-and-hold circuit configured to hold the obtained gate voltage.

3. The electronic device of claim 2, wherein the gate clamp circuit further comprises a clamp circuit configured to pull current when a current gate voltage of the gate terminal of the current regulation transistor exceeds the held obtained gate voltage.

4. The electronic device of claim 3, wherein the gate clamp circuit further comprises a timing circuit configured to activate the gate clamp circuit during the portion of the subsequent on pulse.

5. The electronic device of claim 1, wherein the gate clamp circuit comprises a replica of the current regulation transistor and the operational amplifier, the replica configured to obtain a replica device gate voltage corresponding to the obtained gate voltage.

6. The electronic device of claim 5, wherein the gate clamp circuit further comprises a clamp circuit configured to pull current when a current gate voltage of the gate terminal of the current regulation transistor exceeds the replica device gate voltage.

7. The electronic device of claim 6, wherein the gate clamp circuit further comprises a clamp timing circuit configured to activate the gate clamp circuit during the portion of the subsequent on pulse.

8. The electronic device of claim 6, wherein the clamp circuit comprises a source follower circuit.

9. The electronic device of claim 8, wherein the source follower circuit comprises a transistor having a gate terminal that is coupled to a first side of a current sink.

10. The electronic device of claim 9, wherein the transistor also includes a first source/drain terminal switchably coupled to the gate voltage of the gate terminal of the current regulation transistor and a second source/drain terminal coupled to a second side of the current sink.

11. A method, comprising:
    controlling current through at least one light-emitting diode using a pulse-width-modulation transistor and a current regulation transistor coupled in series with the at least one light-emitting diode;
    during an on pulse of the pulse-width-modulation transistor, obtaining a gate voltage of a gate terminal of the current regulation transistor;
    during an off pulse of the pulse-width-modulation transistor, storing the gate voltage of the current regulation transistor; and
    during a subsequent on pulse of the pulse-width-modulation transistor, clamping the gate terminal of the current regulation transistor to the stored gate voltage using a clamping circuit coupled to the gate terminal of the current regulation transistor.

12. The method of claim 11, further comprising, during a portion of the subsequent on pulse of the pulse-width-modulation transistor, activating the clamping circuit using a clamp timing circuit.

13. The method of claim 12, wherein clamping the gate terminal of the current regulation transistor comprises clamping the gate terminal of the current regulation transistor while the clamping circuit is active during the portion of the subsequent on pulse.

14. The method of claim 13, wherein the portion of the subsequent on pulse is less than ten percent of the subsequent on pulse.

15. The method of claim 11, wherein obtaining the gate voltage of the gate terminal of the current regulation transistor comprises sampling the gate voltage using a sample-and-hold circuit of the clamping circuit.

16. The method of claim 15, wherein storing the gate voltage comprising holding the sampled gate voltage with the sample-and-hold circuit.

17. An electronic device having a display with a backlight, the backlight comprising:
    a light-emitting diode;
    a pulse-width modulation controller configured to control an average current through the light-emitting diode;
    a current regulation controller configured to control a peak current through the light-emitting diode; and
    a clamping circuit coupled to the current regulation controller and configured to clamp a voltage of the current regulation controller during at least a portion of an on pulse of the pulse-width modulation controller,
    wherein the clamping circuit is further configured to sample a voltage of the clamping circuit during a prior on pulse of the pulse-width modulation controller and to clamp the voltage of the current regulation controller to the sampled voltage.

18. The electronic device of claim 17, wherein the clamping circuit comprises:
    a sample-and-hold circuit configured to hold the sampled voltage;

a clamp circuit configured to pull current when a gate voltage of a gate terminal of a transistor of the current regulation controller exceeds the held voltage; and a timing circuit configured to activate the clamp circuit during the portion of the on pulse.

\* \* \* \* \*